United States Patent [19]

McAlaster

[11] 4,313,429
[45] Feb. 2, 1982

[54] SOLAR AIR COLLECTOR

[76] Inventor: Robert J. McAlaster, 1593 Pioneer, Talent, Oreg. 97540

[21] Appl. No.: 151,277

[22] Filed: May 19, 1980

[51] Int. Cl.³ ............................................. F24J 3/02
[52] U.S. Cl. .................................... 126/445; 126/450
[58] Field of Search .............. 126/444, 445, 429, 441, 126/449, 450; 165/176

[56] References Cited

U.S. PATENT DOCUMENTS

| | | | |
|---|---|---|---|
| 3,875,925 | 4/1975 | Johnston | 126/441 |
| 3,981,294 | 9/1976 | Deminet | 126/445 |
| 4,098,262 | 7/1978 | Peters | 126/444 |
| 4,114,599 | 9/1978 | Stephens | 126/445 |
| 4,122,828 | 10/1978 | Di Peri | 126/445 |
| 4,129,117 | 12/1978 | Harvey | 126/449 |
| 4,151,830 | 5/1979 | Crombie | 126/444 |
| 4,186,720 | 2/1980 | Schmauder | 126/445 |
| 4,203,421 | 5/1980 | Bencic | 126/444 |
| 4,203,425 | 5/1980 | Clark | 126/445 |

Primary Examiner—Daniel J. O'Connor
Attorney, Agent, or Firm—Kolisch, Hartwell & Dickinson

[57] ABSTRACT

A solar-collecting apparatus constructed for placement against a structure as against a wall or roof. When installed in a wall or roof it may form a portion of the structure. The apparatus includes an elongate housing having sides and a backing and a transparent glazing covering the housing. A collector assembly in the housing is composed of an outer solar-collector panel and an inner panel which forms with the backing and collector panel, respectively, inner and outer plenums which communicate with each other at one end of the housing. Inlet and outlet ports formed in the housing, adjacent its other end, communicate with the inner and outer plenums, respectively. Forced air admitted into the apparatus through the inlet travels through the inner plenum in one direction and through the outer plenum, alongside the collector panel, in the opposite direction toward the outlet. Baffles placed between the two panels increase heat exchange between the collector panel and air flowing through the outer plenum.

3 Claims, 5 Drawing Figures

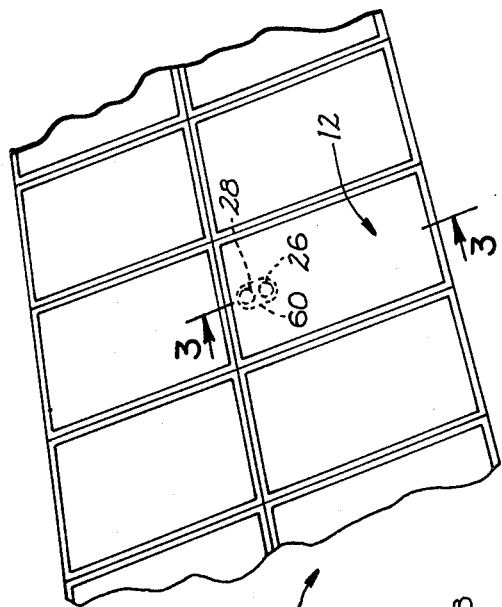
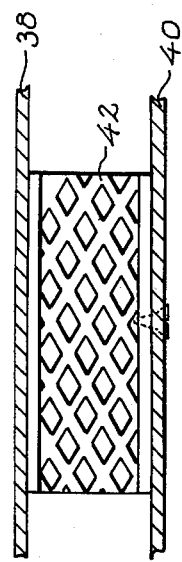
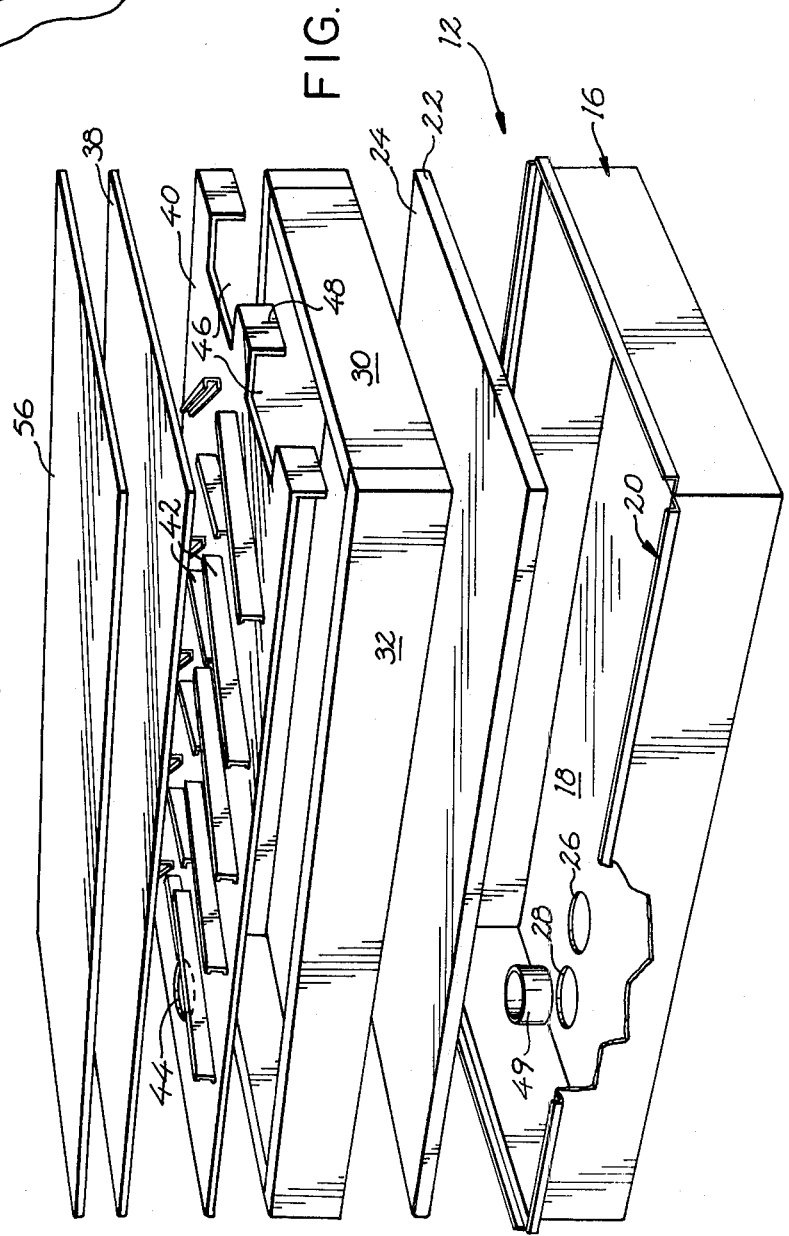

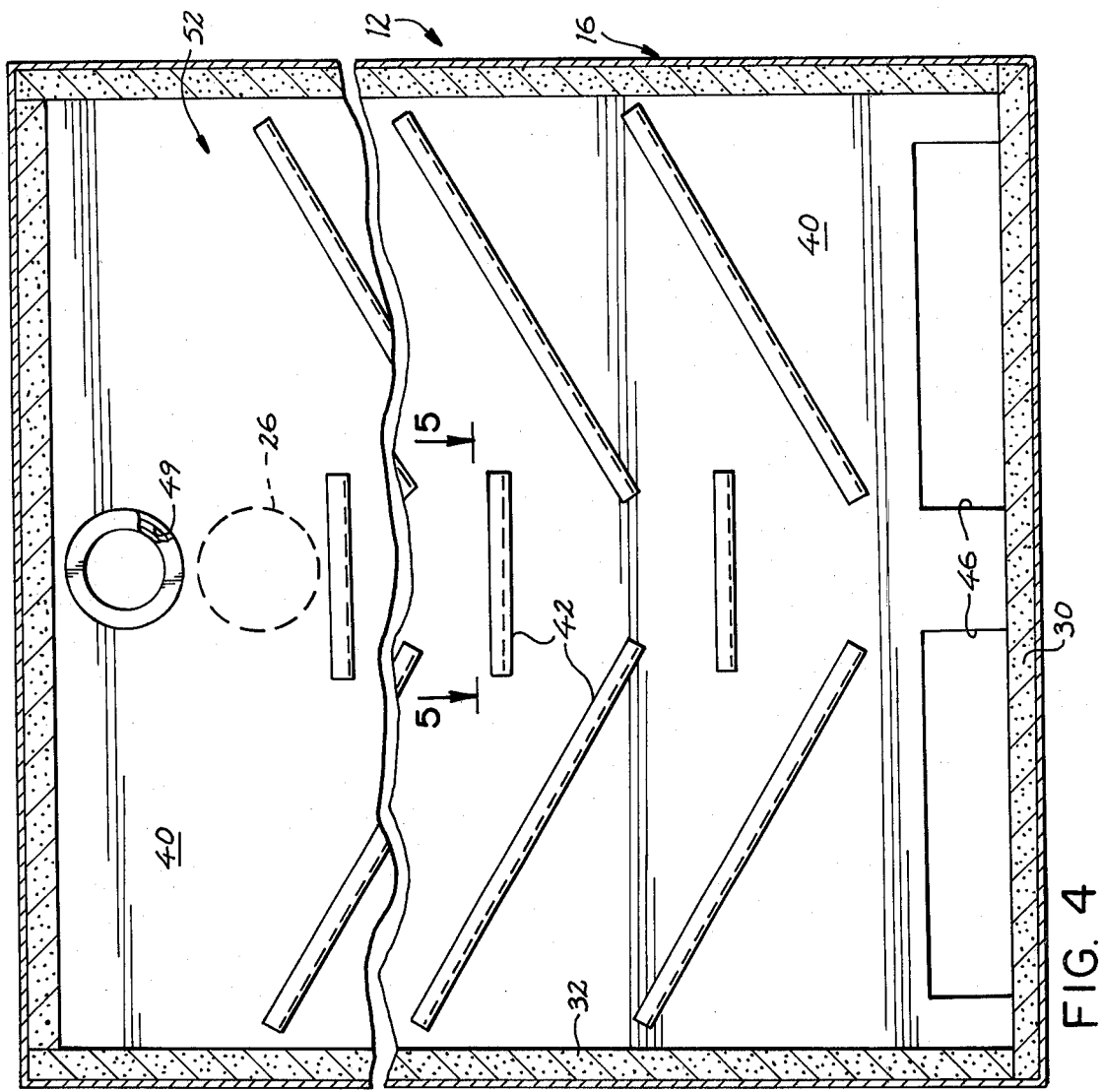
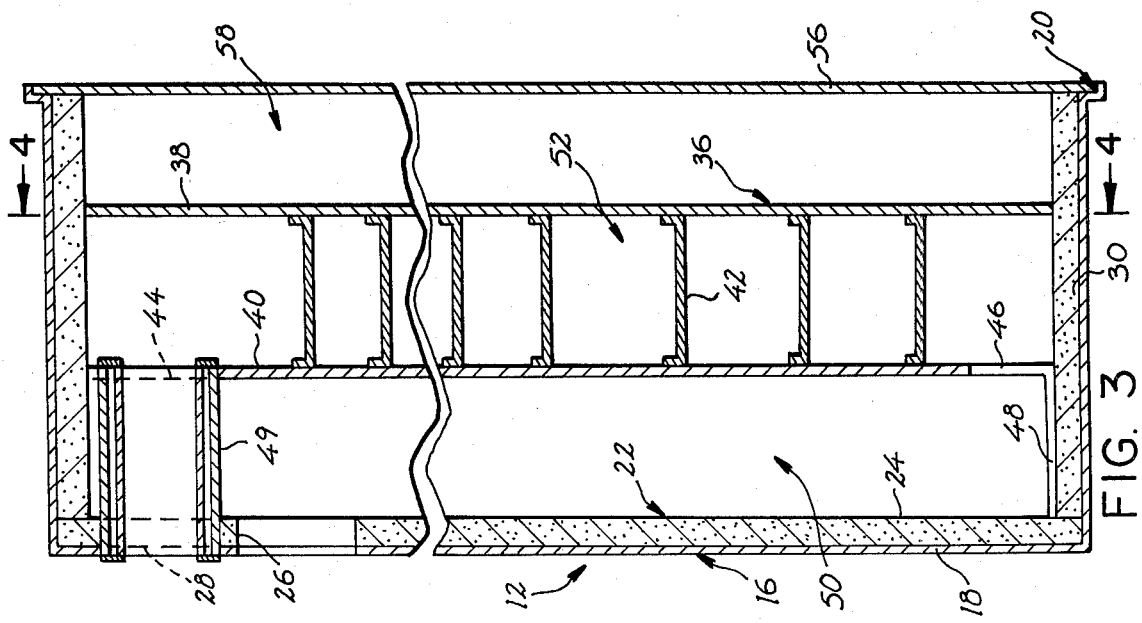

SOLAR AIR COLLECTOR

BACKGROUND AND SUMMARY OF THE INVENTION

The present invention relates to solar-collecting apparatus, and more particularly, to apparatus adapted to cover a portion of a structure to provide heat thereto.

Solar collecting units designed to provide space heating in a dwelling are known in the prior art. Typically, these are elongate units adapted to be joined edge-to-edge to cover that portion of a dwelling which is exposed to the sun. One such prior art unit includes an elongate housing having therein a pair of parallel spaced apart plates, the outer one of which is constructed to collect solar energy, and the inner one of which forms with the solar-collecting panel, an elongate plenum which communicates with an inlet and outlet located adjacent opposite ends the housing. Forced air circulating through the plenum from its inlet toward its outlet end is warmed by passage through the plenum alongside the solar-collecting panel.

For a variety of reasons, a solar-collecting unit of the type just described may not operate at optimal efficiency. Air flowing between the two panels becomes progressively hotter as it approaches the unit's outlet end. This produces, in effect, heat transfer from the outer, solar-collecting panel to the inner panel, from which heat may be transferred to the unit's housing, and from there to the atmosphere. Air flow through the unit between the two panels is substantially unobstructed, and therefore characteristically laminar. As a result heat transfer from the solar-heated panel to the air flowing through the unit may be incomplete. In many prior art solar-collector units, the solar-collecting panel is attached directly to the unit's metal housing. This construction facilitates heat transfer from the outer and inner panels to the housing, this being lost heat.

In the installation of solar-collector units known in the prior art, it is necessary to precut, in each area on the structure which is to receive a unit, a pair of spaced apart openings for accessing the inlet and outlet in each unit.

One object of the present invention is to provide a solar-collecting apparatus which substantially overcomes the above-mentioned problems associated with solar-collecting units in the prior art.

A more specific object of the invention is to provide such apparatus constructed to produce efficient transfer of solar-collected heat to air circulating through the unit.

It is another object of the invention to provide solar-collecting apparatus having a pair of elongate plenums through which air circulates, in reverse directions, from an inlet to an outlet located adjacent a common end of the apparatus.

Yet another object of the invention is to provide such apparatus constructed to create intimate contact between a solar-heated panel and air circulating through the apparatus.

Another object of the invention is to provide, in such apparatus, a solar-collector panel which is insulated from the apparatus' housing.

The present invention in solar-collecting apparatus includes an elongate housing and a solar-collecting panel mounted therein for collecting solar energy in the form of heat. A second panel in the housing forms with a housing backing and the solar-collecting panel, inner and outer plenums, respectively, which communicate with each other adjacent one end of the housing. Inlet and outlet ports adjacent the other end of the housing communicate with the inner and outer plenums, respectively, creating an air passageway from the inlet through the inner plenum, in one direction, and in the opposite direction, through the outer plenum toward the outlet. Baffle structure placed between the two panels acts to increase the path of travel of air flowing through the outer panel alongside the solar-collecting panel.

In a preferred embodiment of the invention, the backing covers one side of the housing, with the opposite side of the housing being covered by a glazing. The solar-collecting panel is insulated from the housing and spaced from the glazing, forming therebetween a closed, insulative air space. The baffle structure comprises a plurality of heat-conductive mesh elements which interconnect the two panels and are distributed laterally and longitudinally therealong.

These and other objects and features of the present invention will become more fully apparent when the following detailed description of a preferred embodiment of the invention is read in connection with the accompanying drawings, wherein:

FIG. 1 is a fragmentary portion of a structure having mounted thereon plural solar-collecting units constructed according to the present invention;

FIG. 2 is an exploded view of a unit shown in FIG. 1;

FIG. 3 is a sectional view of the unit taken along line 3—3 in FIG. 1;

FIG. 4 is a sectional view of the unit taken along line 4—4 in FIG. 3; and

FIG. 5 is an enlarged sectional view taken along line 5—5 in FIG. 4.

DETAILED DESCRIPTION OF A PREFERRED EMBODIMENT OF THE INVENTION

Looking now at the figures, and first at FIG. 1, there is shown at 10 a fragmentary portion of a structure having an exterior surface which is covered by a plurality of self-contained solar-collecting apparatus, or units, constructed according to the present invention. Structure 10 may be a building, dwelling of the like, with its covered exterior surface preferably being that portion most exposed to direct sunlight during winter months. The construction and operation of the units will be described below with reference to a unit 12, which is representative.

Looking now at FIGS. 2, 3 and 4, unit 12 includes an elongate frame, or housing 16 having a backing 18 and upturned edge portions forming four side walls which are joined, as by welding, at their common edges. The upper edges of the housing side walls in FIG. 2 are fashioned outwardly and upwardly to form a lip 20 about the upper edge of the housing, for a purpose to be described. Housing 16 is preferably formed of sheet metal.

The inner surface of backing 18 (that surface visible in FIG. 2) is covered by an insulative pad 22 which is attached to the backing as by adhesives. Pad 22, which is formed of an insulative mat of fiberglass or the like, is covered on its upper surface in FIG. 2 by a reflective covering 24 of aluminum foil or the like. A pair of ports 26, 28 are formed in backing 18 and pad 22, adjacent the left end of the housing in FIG. 2 (the upper housing end in FIGS. 3 and 4). As will be seen below, ports 26, 28 form an air inlet and an air outlet, respectively, for the unit.

The inner surfaces of the side walls in housing 16 are covered by insulative strips, such as strips 30, 32 in FIGS. 2 and 4. Each of these strips is composed of an insulative pad which is backed, at its side opposite the associated housing wall, by the reflective foil covering. As seen in FIG. 3, these strips, such as strip 30, extend between pad 22 and the edges of the housing adjacent lip 20.

A collector assembly, indicated generally at 36 in FIG. 3, includes an outer, solar-collecting panel 38, an inner panel 40, and a plurality of baffles, such as baffles 42, joining the two panels in spaced-apart, parallel-planar relationship. Panel 38 is designed to receive solar energy on its upper surface in FIG. 2 and transfer this energy through the panel in the form of heat. Panel 38 is preferably sheet metal having a non-reflective black coating on its upper surface in FIG. 2. This panel is also referred to herebelow as collector means.

Panel 40, which has the same planar dimensions as panel 38, is also formed of sheet-metal, and may have a non-reflective black coating on its lower, or inner surface in FIG. 2. The panel is ported at 44 adjacent is left end in FIG. 2 and has formed therein, adjacent its opposite end in this figure, a pair of cutouts 46. The three lower (right in FIG. 2) edge portions in panel 40 are angled to form foot portions, such as portion 48, which serve to space panel 40 from backing 18, as will be seen.

Baffles, such as baffles 42, take the form of elongate troughs having a central portion bordered by a pair of spaced-apart parallel side walls. Each baffle is formed of a length of metal screen mesh whose opposed side portions are fashioned upwardly to form the side walls of the baffle. FIG. 5 shows a typical pattern in the mesh used to forming the baffles.

The baffles are attached to the upper, or outer, surface of panel 40 by metal screws or the like as seen in FIG. 5. A preferred pattern of baffles on panel 40 is shown in FIG. 4. Essentially the pattern consists of two columns of relatively long and upwardly inclined baffles, and a central column of relatively short baffles substantially paralleling the opposed end edges of the panel. In the fully assembled unit panel 38 is disposed against the upper side walls of the baffles in FIG. 2, in heat-exchange relationship therewith.

As seen best in FIG. 3 the edges of the panels 38, 40 are received against the insulative strips, such as strips 30, 32, lining the housing side walls. Panel 40 is spaced from pad 22, at its lower end in FIG. 3, by foot portions, such as portion 48. The spacing between the panel and the pad is maintained, adjacent the panel's upper end in FIG. 3, by a metal duct 49 connecting ports 44, 28. Duct 49 includes an outer insulative metal lining which is secured to ports 28, 44 as by welding.

There is thus formed in unit 12 an elongate inner air space, or plenum, 50 between pad 22 and panel 40, and an elongate outer air space, or plenum, 52 between panels 38, 40. Plenums 50, 52 are ported, adjacent their upper end regions in FIG. 3 by port 26 and duct 49, respectively. The two spaces communicate with each other, adjacent their lower end regions in FIG. 3, through cutouts 46. Panel 40 is also referred to herebelow as panel means producing an air passageway which includes plenums 50, 52. Cutouts 46 are also referred to herein as means communicating said inner and outer plenums.

The upper face of unit in FIG. 2 is covered by a transparent glazing 56. The glazing, which may be a stiff plate of either plastic or glass, is dimensioned to fit in lip 20 as seen in FIG. 3. The glazing is sealed against the lip by a suitable sealant. As seen in FIG. 3, glazing 56 forms with panel 38, a closed outer space 58 in unit 12.

Installation and operation of a solar-collecting unit, such as unit 12, on a structure, such as structure 10, will now be considered. The structure is prepared initially by forming in the structure surface to be covered, a series of regularly spaced elongate openings, such as opening 60 shown in FIG. 1. These openings provide access through the exterior of the structure to the two ports, such as ports 26, 28 in a unit, such as unit 12. The housing and glazing are also referred to collectively as an enclosure. The units are then attached to the prepared surface of the structure by a suitable weather-resistant adhesive or the like, being arranged thereon in an edge-to-edge configuration such as shown in FIG. 1. The abutting lip edges in adjacent units may be sealed suitably by flashing. Thus mounted the units form a continuous weatherproof covering of a roof or side wall of the structure.

To complete the installation of the units, each of the inlets, such as inlet 26 in unit 12, is connected to a source of forced air within the structure. Similarly each of the outlets, such as outlet 28 in unit 12, is connected to a suitable heat receptacle within the structure. The receptacle may be a heat exchanger which cooperates with a hot water heater, furnace, or the like, to provide heat thereto. Alternatively, the outlet ports, such as port 28 in unit 12, may be vented directed into rooms within the structure, to provide space heating to the structure.

In operation sunlight striking unit 12 passes through glazing 56 and is absorbed on the outer surface of panel 38. A portion of the heat produced thereby in panel 38 is transferred to baffles, such as baffles 42, and from the baffles to panel 40. Forced air from a forced-air source noted above is admitted into unit 12 through the unit's inlet 26. With reference to FIG. 3, the air travels initially downwardly in plenum 50, alongside the left surface of panel 40, picking up heat from this panel and thus helping to keep it somewhat cool. The forced air then travels through cutouts 46 into plenum 52. With reference particularly to FIG. 4, as the forced air travels upwardly in this plenum and encounters the baffles therein, some of the air will pass through the mesh in the baffles, picking up heat which has been transferred to the baffles from panel 38 and some will be diverted by the baffles generally upwardly and outwardly. The baffles thus serve to produce considerable irregular flow and turbulence in the air flowing through space 52, bringing the air into repeated intimate contact with the heated surfaces within plenum 52. From the upper region of plenum 52 in FIGS. 3 and 4, heated air is vented from unit 12 through duct 49 into the abovementioned heat receptacle in structure 10.

From the foregoing, it can be appreciated how various objects of the present invention are met. The unit includes several features which limit heat transfer from the collector assembly to the unit's housing. The rear panel of the collector unit adjacent the housing backing is kept in a relatively cool state by circulation of air between the backing and the panel. Radiative transfer between such panel and backing is largely prevented by the insulative, reflective pad on the backing and the radiation-absorbing surface coating on the panel. Both panels in the collector unit are insulated from the housing by insulative strips, such as strips 30, 32 lining the sides of the housing.

The collector assembly is constructed to enhance heat transfer to air circulating through the assembly. The screen mesh baffles in the assembly provide an increased heated surface area in the assembly against which the circulating air comes into contact through its passage through the assembly. The baffles further serves to create air turbulence within the assembly, effectively increasing the pathway of air traveling to the assembly, and the probability of contact of the air against the structures within the assembly.

Finally, the unit is relatively easily installed on a structure inasmuch as the inlet and outlet in a unit are arranged closely together and only one access hole in the structure need be formed for each unit.

Although a specific embodiment of the present invention has been described herein, it is apparent that various changes and modifications may be made without departing from the spirit of the invention.

It is claimed and desired to secure by Letters Patent:

1. Self-contained solar heat collecting unit adapted to be placed against a structure, said unit comprising
   an elongate enclosure having an inner backing and upstanding side walls whose interior surfaces are lined with insulation, and an outer transparent glazing,
   supported within said enclosure, an inner, elongate heat-conductive panel having an outer surface and an inner surface confronting and spaced from said backing, said panel being dimensioned to form with the insulation-lined interior surfaces of said backing and side walls, an elongate inner air plenum,
   a plurality of upstanding heat-conductive baffles mounted on said panel's outer surface in heat-conductive relationship therewith, and arranged thereon for creating air turbulence in a stream of air flowing in an end-to-end direction across said outer surface,
   an outer elongate solar collecting heat-conductive panel supported in said enclosure by said baffles, in heat-conductive relationship therewith, at a position spaced from said outer surface, said outer panel being dimensioned to form with said inner panel's outer surface and insulation-lined interior surfaces of said side walls, an elongate outer air plenum,
   means in said inner panel, adjacent one end of said unit, communicating said inner and outer plenums, and
   an inlet and an outlet adjacent the unit's other end communicating the exterior of said enclosure with said inner and outer plenums, respectively.

2. The unit of claim 1, wherein said baffles are formed of metal screen mesh.

3. The unit of claim 1, wherein means supporting said inner panel in said enclosure includes a foot portion formed in said inner panel, adjacent said unit's one end, and a duct in said outlet joining said inner panel and said backing.

* * * * *